(12) United States Patent
Inukai

(10) Patent No.: US 7,924,339 B2
(45) Date of Patent: Apr. 12, 2011

(54) IMAGE PICKUP APPARATUS HAVING A HELP FUNCTION, AND METHOD AND PROGRAM FOR CONTROLLING THE SAME

(75) Inventor: Hiroaki Inukai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 621 days.

(21) Appl. No.: 11/679,317

(22) Filed: Feb. 27, 2007

(65) Prior Publication Data
US 2007/0200945 A1    Aug. 30, 2007

(30) Foreign Application Priority Data

Feb. 28, 2006    (JP) ................................. 2006-052934

(51) Int. Cl.
*H04N 5/222* (2006.01)
(52) U.S. Cl. .................................................. 348/333.02
(58) Field of Classification Search ........................ None
See application file for complete search history.

(56) References Cited

U.S. PATENT DOCUMENTS

| | | | |
|---|---|---|---|
| 5,281,106 A | 1/1994 | Reinhardt et al. | |
| 6,577,821 B2 | 6/2003 | Malloy Desormeaux | |
| 6,654,559 B2 | 11/2003 | Aoyama | |
| 6,906,751 B1 * | 6/2005 | Norita et al. ................... | 348/349 |
| 7,319,490 B2 * | 1/2008 | Kanamori et al. ............. | 348/375 |
| 2003/0206239 A1 * | 11/2003 | Battles ...................... | 348/333.02 |
| 2005/0195293 A1 * | 9/2005 | Kobayashi et al. ....... | 348/231.99 |
| 2007/0013781 A1 * | 1/2007 | Kageyama et al. ......... | 348/207.2 |

FOREIGN PATENT DOCUMENTS

| | | |
|---|---|---|
| CN | 2414241 | 1/2001 |
| JP | 5-216106 A | 8/1993 |
| JP | 05-216106 A | 8/1993 |
| JP | 2003-319213 | 11/2003 |
| JP | 2003-330057 A | 11/2003 |
| JP | 2003319213 A * | 11/2003 |

* cited by examiner

*Primary Examiner* — Sinh Tran
*Assistant Examiner* — Anthony J Daniels
(74) *Attorney, Agent, or Firm* — Canon USA Inc IP Division

(57) ABSTRACT

An image pickup apparatus with a help function has a help mode in which a state or representation illustrating operating conditions is displayed on a display unit without actually applying a state or operating condition selected by operating an operating member to the image pickup apparatus. The image pickup apparatus includes a release button for issuing a photographing instruction, and a unit that, when the release button issues the photographing instruction, performs photographing under predetermined conditions regardless of a state or operating condition selected by operating the operating member during a help mode.

11 Claims, 13 Drawing Sheets

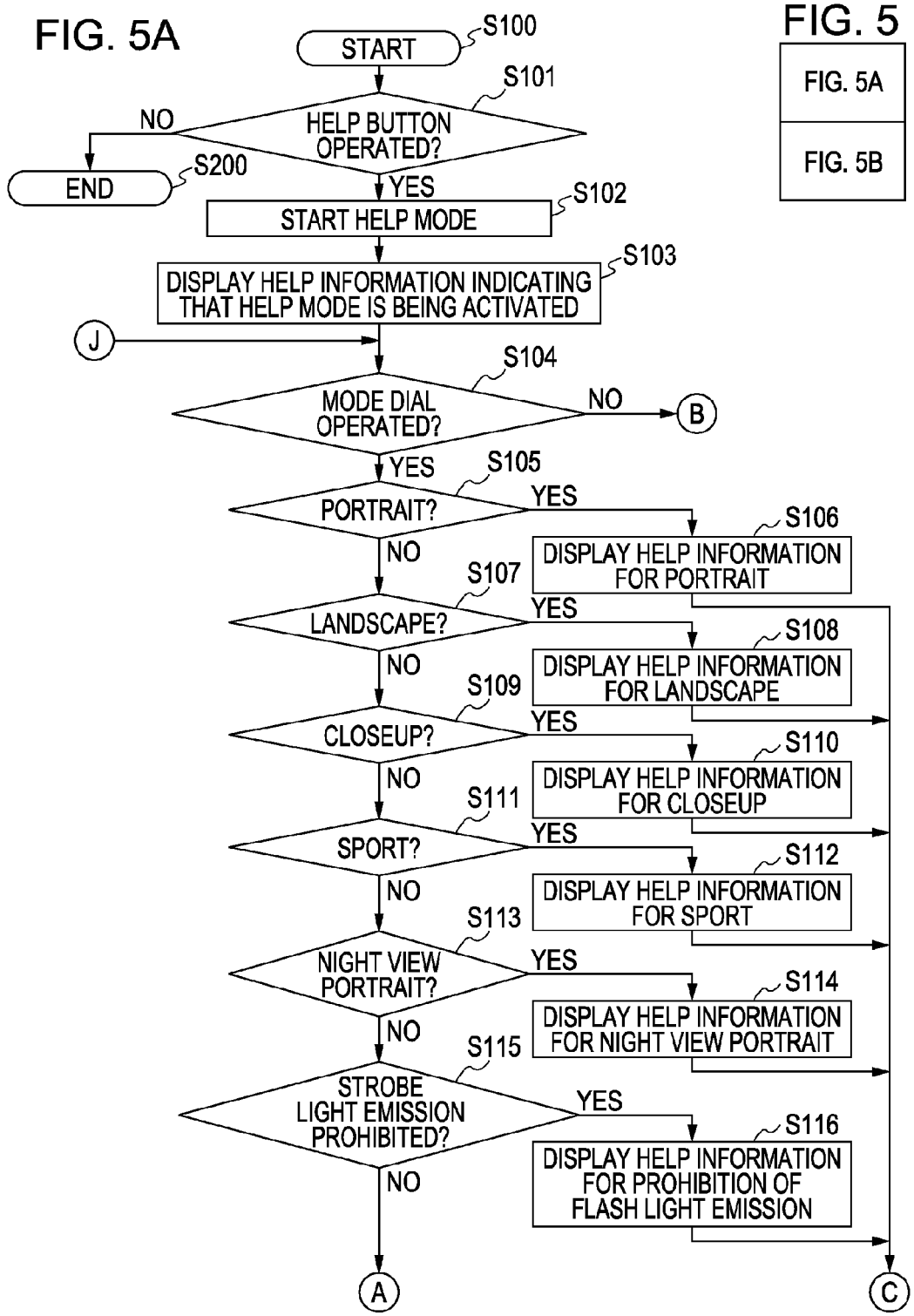

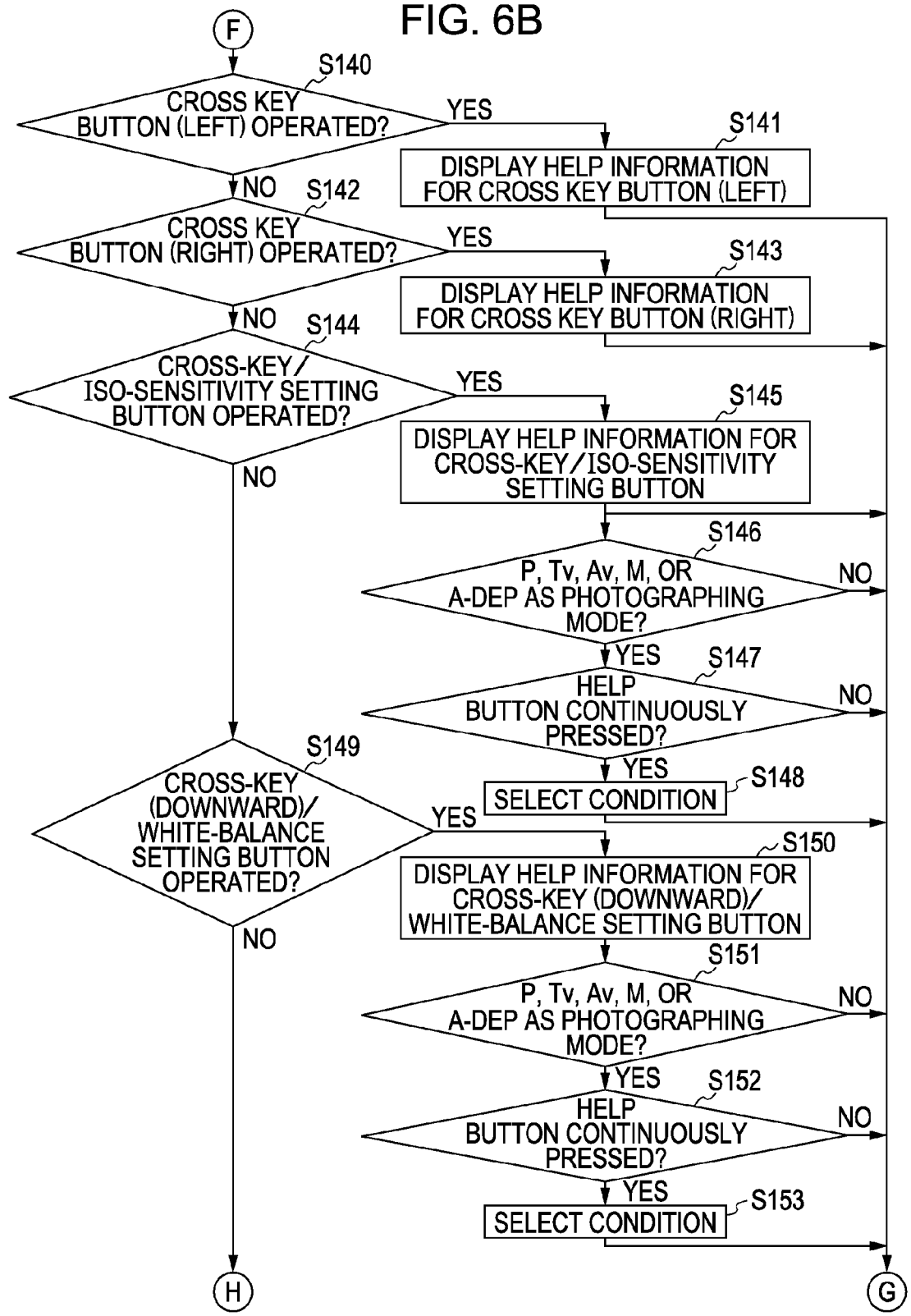

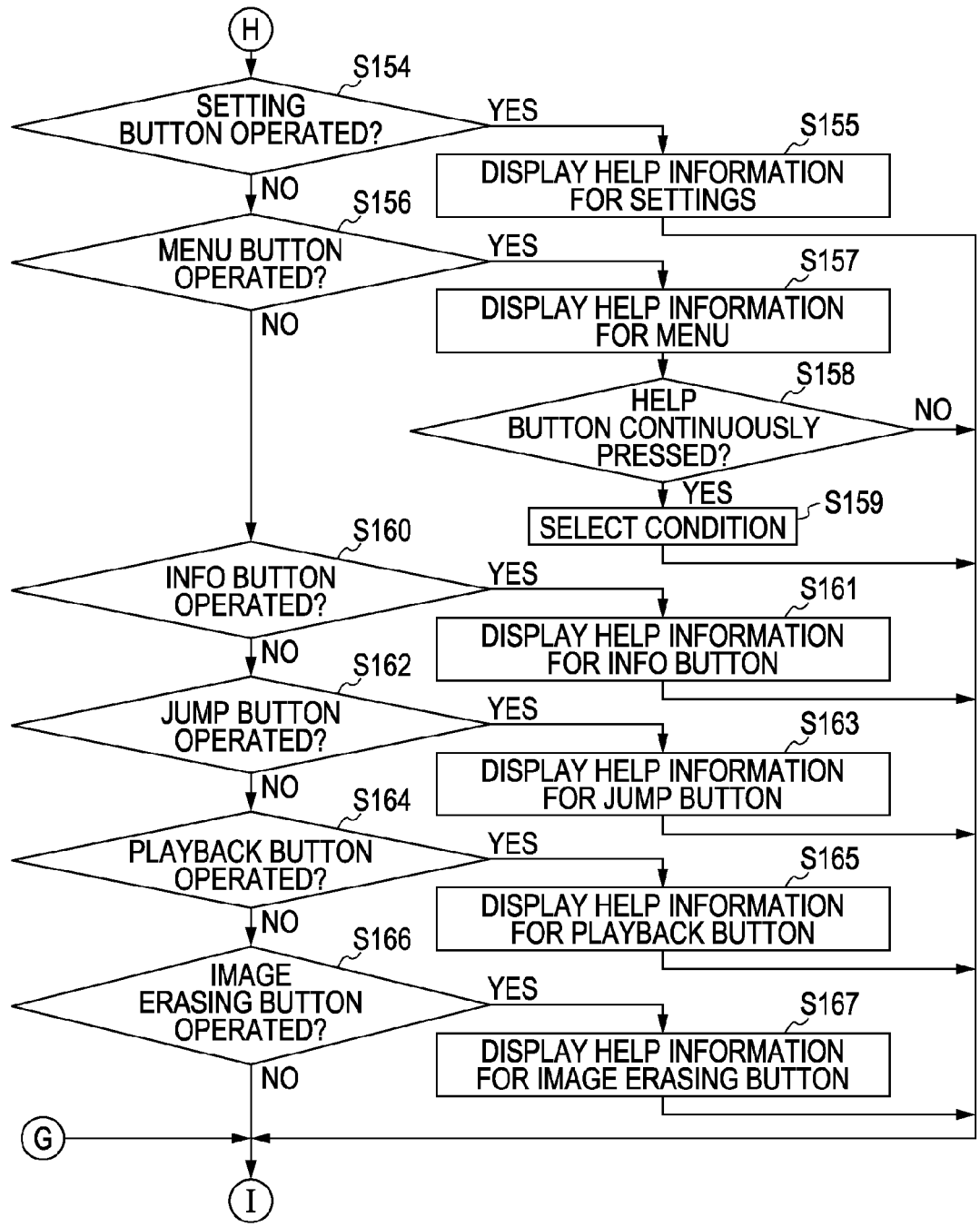

1001

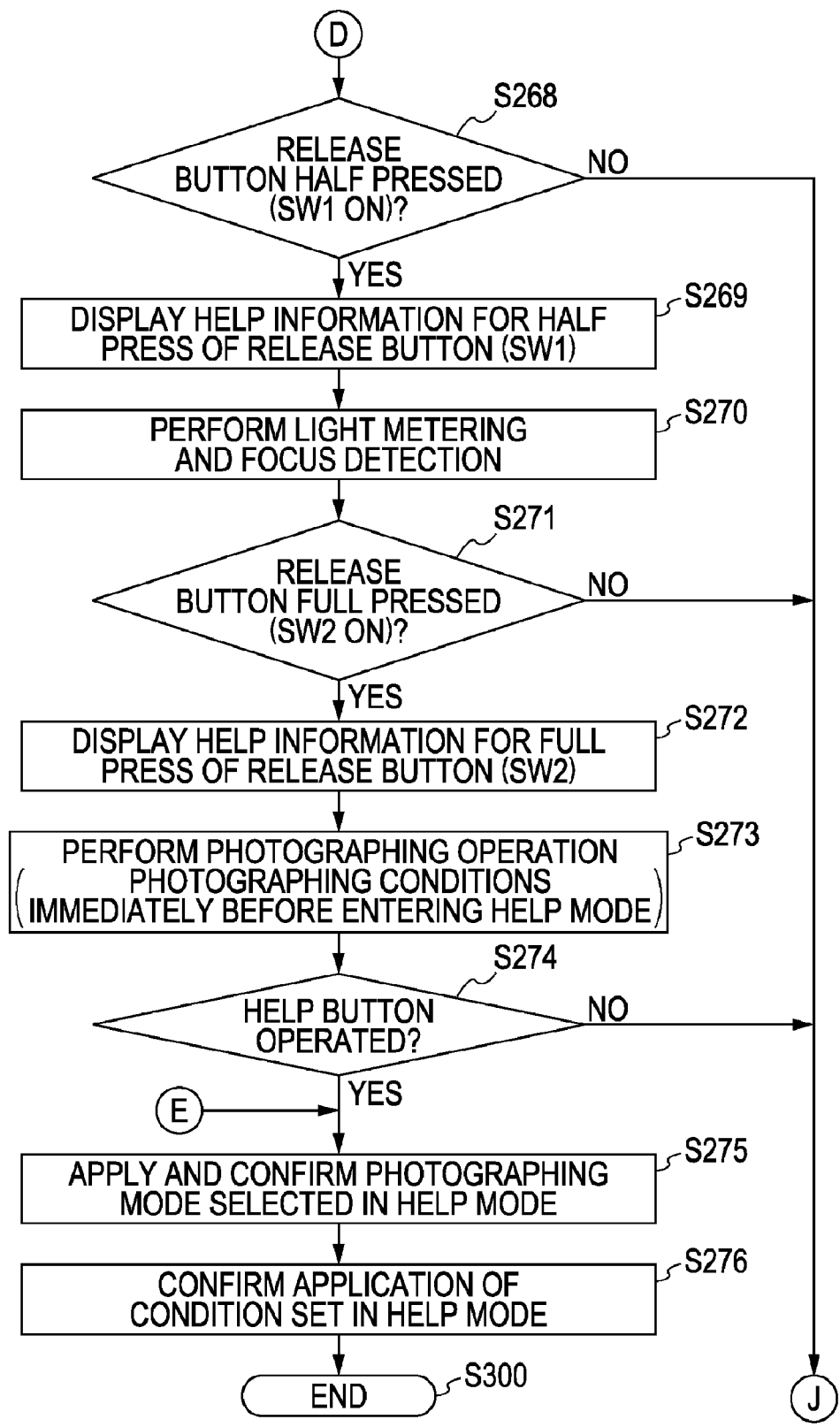

IMAGE PICKUP APPARATUS HAVING A HELP FUNCTION, AND METHOD AND PROGRAM FOR CONTROLLING THE SAME

BACKGROUND OF THE INVENTION

1. Field of the Invention

The present invention relates to the operation of an image pickup apparatus and control of the image pickup apparatus at the time of photographing, and in particular, to control of an image pickup apparatus having a help function using a display device.

2. Description of the Related Art

With diversification of functions of image pickup apparatus typified by digital cameras of recent years, an operation for setting states or operating conditions of an image pickup apparatus has become complex. Accordingly, an operation method must be remembered by reading an instruction manual or the like. In addition, the instruction manual must be carried even at the time of photographing until the operation method is sufficiently remembered. This is extremely inconvenient for a user of the image pickup apparatus.

Accordingly, an image pickup apparatus (see, for example, Japanese Patent Laid-Open No. 5-216106) having a help function has been proposed. This image pickup apparatus uses the help function to display the state of the apparatus or a representation illustrating operating conditions of the apparatus on a display device provided on an external surface of the apparatus. This enables a photographer to easily know details of usage of various functions, effects obtained by the functions, etc., only with the image pickup apparatus.

In addition, an image pickup apparatus (see, for example, Japanese Unexamined Patent Application Publication No. 2003-330057) has been proposed in which photographing is allowed under predetermined conditions in a help mode in which, in response to an operation on an operating member of the apparatus, a representation illustrating the operation is displayed while setting corresponding to the operation is applied to the apparatus. This enables a photographer to perform photographing even during the help mode.

However, the image pickup apparatus disclosed in Japanese Patent Laid-Open No. 5-216106 cannot perform photographing in the help function for displaying the state or the representation illustrating the operating conditions since the image pickup apparatus cannot operate during the help function.

In the image pickup apparatus disclosed in Japanese Unexamined Patent Application Publication No. 2003-330057, an image pickup operation cannot be immediately activated since photographing is not allowed unless predetermined conditions are satisfied. This may miss a shutter release opportunity. In addition, in this case, the apparatus state or operating conditions altered during the help mode are applied to the apparatus. Thus, the altered apparatus state or operating conditions may differ from those intended by the photographer.

SUMMARY OF THE INVENTION

In view of the above circumstance, the present invention provides an image pickup apparatus which has a help function and in which an image pickup operation is allowed even during a help mode and is quickly performed in an appropriate state or operating conditions.

To solve the above problems, according to a first aspect of the present invention, there is provided an image pickup apparatus having a help function, the image pickup apparatus including a plurality of operating members that set states or operating conditions of the image pickup apparatus, a display unit that displays information concerning the image pickup apparatus, a start instruction unit that instructs a help mode to start, the help mode displaying a representation illustrating a state or operating condition set by operating an operating member among the plurality of operating members on the display unit, a release unit that instructs the image pickup apparatus to perform photographing, and a photographing control unit that, when the release unit instructs the image pickup apparatus to perform photographing after the start instruction unit instructs the help mode to start, executes a photographing operation under predetermined conditions regardless of the state or operating condition set by operating the operating member after the help mode is started.

According to a second aspect of the present invention, there is provided a method for controlling an image pickup apparatus having help mode for displaying, on a display unit, representations illustrating states or operating conditions set by operating a plurality of operating members. The method includes the steps of starting the help mode, displaying, on the display unit, a representation illustrating a state or operating condition set by operating an operating member among the plurality of operating members, when the image pickup apparatus is instructed by a release unit to perform photographing, executing a photographing operation under predetermined conditions regardless of the state or operating condition set by operating the operating member.

According to a third aspect of the present invention, there is provided a program for allowing a computer to execute the above method.

According to the present invention, even during a help mode in which the state of an image pickup apparatus or a representation illustrating operating conditions of the apparatus are displayed, if a shutter release button is operated, photographing is preferentially performed. Thus, the number of times a shutter release opportunity is missed is reduced.

Further features of the present invention will become apparent from the following description of exemplary embodiments with reference to the attached drawings.

BRIEF DESCRIPTION OF THE DRAWINGS

FIG. 12 is a flowchart showing an operation in a help mode of a camera according to a second embodiment of the present invention.

DESCRIPTION OF THE EMBODIMENTS

Exemplary embodiments of the present invention are described below with reference to the accompanying drawings.

First Embodiment

Figure 1:
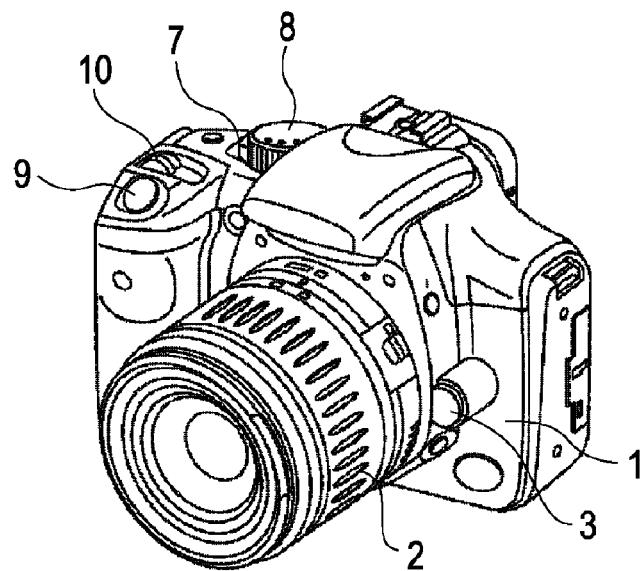
FIG. 1 is a front perspective view of a camera according to a first embodiment of the present invention.
Figure 2:
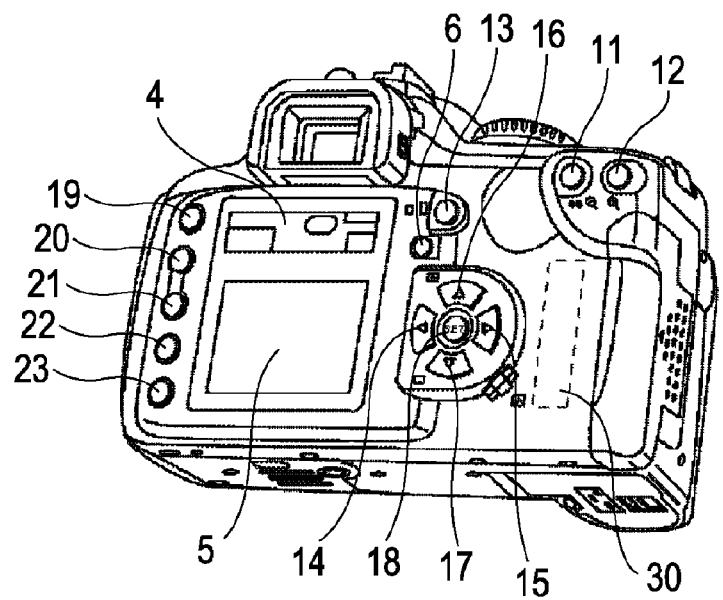
FIG. 2 is a back view of the camera according to the first embodiment.

FIGS. 1 and 2 are front and back views of a camera according to a first embodiment of the present invention, respectively. The camera according to the first embodiment generates image information by using an image pickup element, such as a CCD (charge-coupled device) or CMOS (complementary metal-oxide semiconductor), to photoelectrically convert an image of an object, and records the generated image information in an electronic recording medium such as a memory card.

The camera according to the first embodiment includes a main body 1, a lens unit 2 that is removably mounted on the main body 1, and a lens demount button 3 for demounting the lens unit 2 from the main body 1, a display panel 4 for displaying information such as a camera state and operating conditions, and an image display unit 5 which is used for pickup image selection and confirmation and for menu function selection and setting, and which displays help information (described later).

A help button 6 is used for issuing help mode starting and terminating instructions, etc. By pressing the help button 6 to instruct the camera to start the help mode before operating different operating members (described later), a representation illustrating the camera state or operating condition is displayed on the image display unit 5.

A main switch 7 is used to switch on and off the power supply of the camera. A mode dial switch 8 is used to switch among various photographing modes (camera states) of the camera.

A release button 9 is a two-stage switch for issuing a light-metering and focus-detection initiating instruction and a photographing instruction. A state with the release button 9 half pressed to a first stage is called a "half press" (indicated by "SW1"). In this state, light metering and focus detection are performed. A press of the release button 9 from the half press to a second stage is called a "full press" ("SW2"). By full pressing the release button 9, photographing is performed.

An electronic dial 10 is used to set various operating conditions such as a camera's shutter speed and an aperture value. A button 11 is used as an AE (auto exposure) lock/FE (flash exposure) lock button during photographing to perform AE/FE lock photographing, and is used during playback to reduce a pickup image and to display an index. Accordingly, the button 11 is used to execute different functions during photographing and during playback. An AF (auto focus) frame selection/enlargement button 12 is used in combination with the electronic dial 10 to switch a region to be focused in a pickup image, that is, to switch an AF frame. The AF frame selection/enlargement button 12 is used during playback to enlarge a pickup image. The AF frame selection/enlargement button 12 is also used to execute different functions during photographing and during playback.

An exposure correction button 13 is used in combination with the electronic dial 10 to correct exposure. In a manual photographing mode, by using the exposure correction button 13, the aperture value can be manually set.

A cross key (left) 14 and a cross key (right) 15 are each used for various camera settings and item selection. An ISO (International Organization for Standardization) Speed Ratings setting button 16 is used in combination with the electronic dial 10 to function as a cross key (upward) and to set an ISO Speed Rating value. A white balance setting button 17 is used in combination with the electronic dial 10 to function as a cross key (downward) and to set a white balance. In other words, these keys are not only used to direct directions, and but also have assigned separate functions. In addition, a setting button 18 is used to determine various setting and item selection.

A menu button 19 is used to perform various settings such as a recording image quality and a date/time. An info button 20 is used to display details set in the camera on the image display unit 5 during photographing and to display photographing information of each image during playback. A jump button 21 is used to display each set of predetermined images played back. A playback button 22 is used to play back a pickup image. An image erasing button 23 is used to erase a pickup image.

As described above, the camera according to the first embodiment includes switches, buttons, and dial that are a plurality of operating members operated for setting the state and operating conditions of the camera and for operating the camera.

Figure 3:
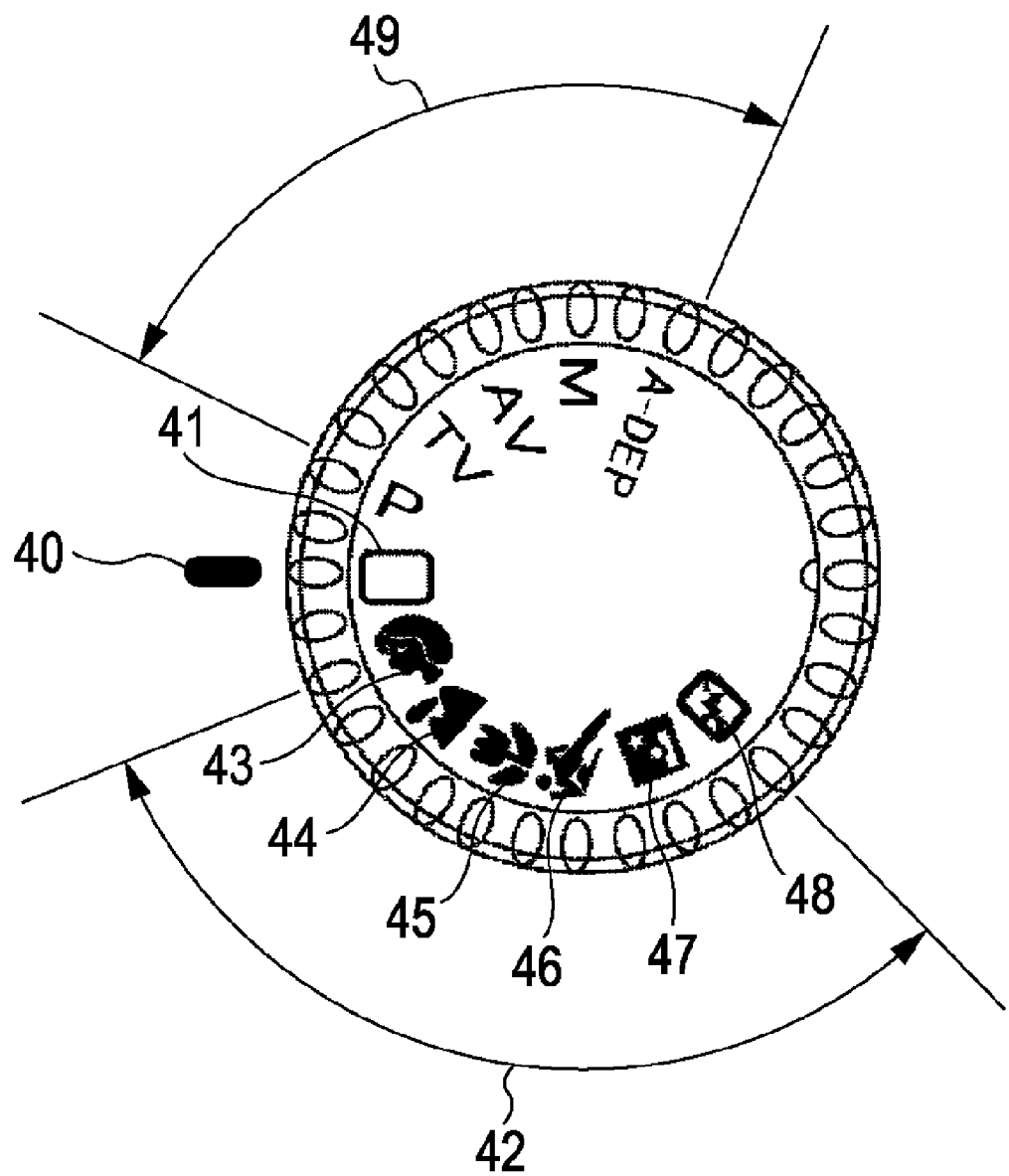
FIG. 3 is an illustration of a mode dial switch of the camera according to the first embodiment.

Next, the function of the mode dial switch 8 is described below with reference to FIG. 3. A mode mark 41 on the mode dial switch 8 represents a full automatic mode. By turning the mode dial switch 8 so that the mode mark 41 matches an index 40 of the camera body side, the full automatic mode can be set. In the full automatic mode, the camera automatically sets an optimal AF frame, an optimal shutter speed, and an optimal aperture value. Accordingly, by only pressing the release button 9, a photographer can easily take a good picture.

In addition, in an image zone 42, the mode dial switch 8 bears a portrait mode mark 43, a landscape mode mark 44, a close-up mode mark 45, a sport mode mark 46, a night view mode 47, and a flash emission prohibition mode 48. By turning the mode dial switch 8 so that one of the mode marks in the image zone 42 matches the index 40 of the camera body side, a photographing mode corresponding to the mode mark can be set.

In a creative zone 49, the mode dial switch 8 bears a program AE photographing mode mark "P", a shutter speed priority AE photographing mode mark "Tv", an aperture priority AE photographing mode mark "Av", a manual exposure mode mark "M", and an auto depth mode mark "A-DEP". By turning the mode dial switch 8 so that one of the mode marks in the creative zone 49 matches the index 40 of the camera body side, a photographing mode corresponding to the mode mark can be set.

Figure 4:
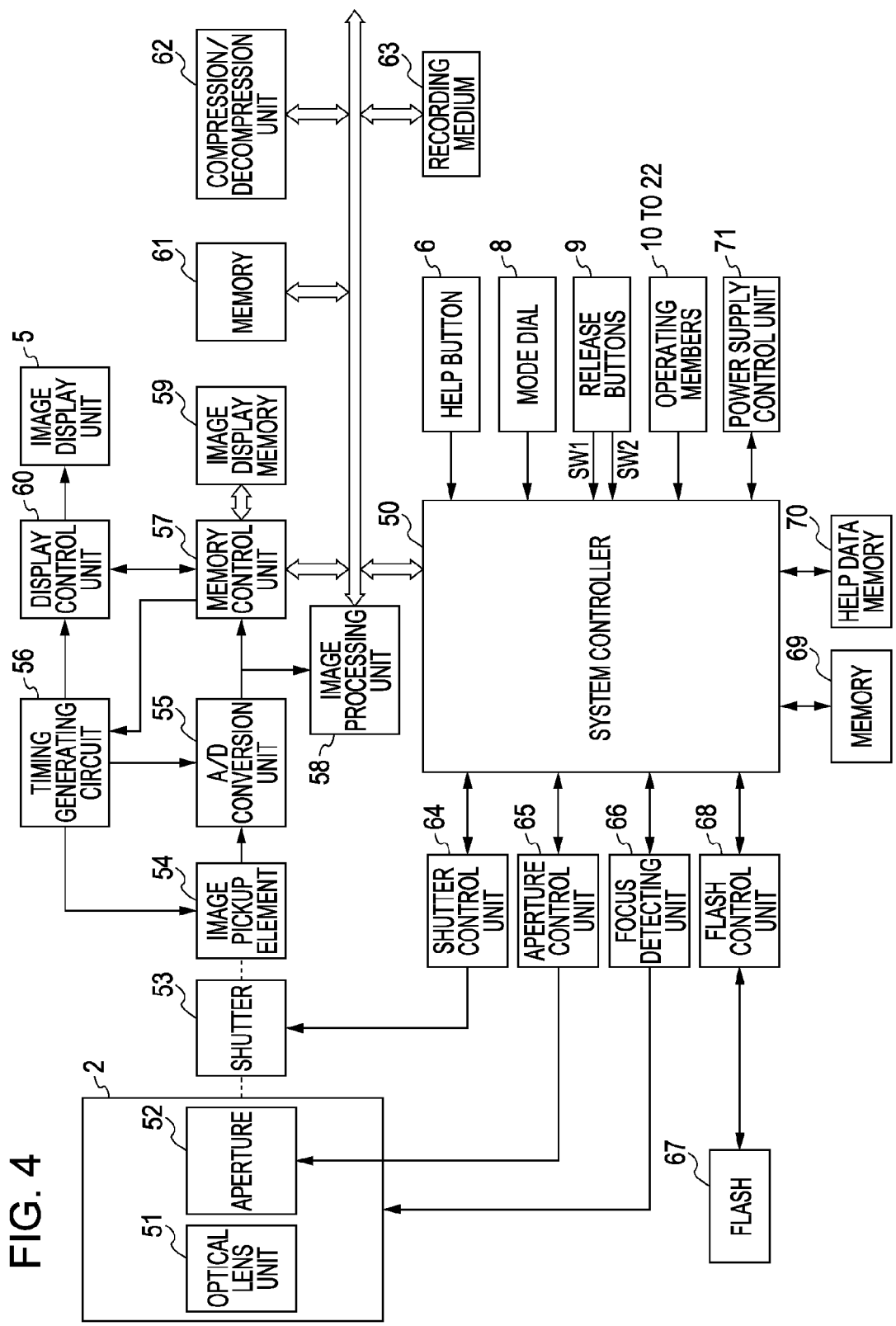
FIG. 4 is a block diagram showing the configuration of a control system of the camera according to the first embodiment.

Next, FIG. 4 is a block diagram showing the configuration of a camera control system. The control system shown in FIG. 4 includes a lens unit 2, a plurality of optical lenses 51, an aperture 52, a shutter 53, an image pickup element 54 for converting an optical image into an electric signal, and an A/D (analog-to-digital) conversion unit 55 for converting an analog image signal from the image pickup element 54 into digital image data. In addition, a timing generating circuit 56 supplies a clock signal and a control signal to the A/D conversion unit 55. The timing generating circuit 56 is controlled by the memory control unit 57 and a system controller 50.

An image processing unit 58 performs predetermined image processing, such as pixel interpolation and color conversion, on image data from the A/D conversion unit 55 or a memory control unit 57.

In addition, the image processing unit 58 performs predetermined computation by using image data output from the A/D conversion unit 55, and also performs TTL (through-the-lens) AWB (auto-white-balance) control processing based on the result of the computation.

The memory control unit 57 controls the A/D conversion unit 55, the timing generating circuit 56, the image processing unit 58, an image display memory 59, a display control unit 60, a memory 61, and a compression/decompression unit 62. Data output from the A/D conversion unit 55 passes through the image processing unit 58 and the memory control unit 57 or directly passes through the memory control unit 57 before being written in the image display memory 59 or the memory 61.

The memory 61 stores images obtained by photographing, and has a sufficient storage capacity for storing a predetermined number of images. The compression/decompression unit 62 compresses or decompresses image data read from the memory 61 in accordance with a predetermined image compression method (for example, adaptive discrete cosine transformation or the like). The compression/decompression unit 62 reads the image data stored in the memory 61, compresses or decompresses the read image, and writes the processed image data into the memory 61. The processed image data is further recorded on a removable recording medium 63. The recording medium 63 is formed by a nonvolatile memory such as a flash memory. The memory 61 can be used as a work area for the system controller 50. The memory 61 is also used in the case of reading image data from the recording medium 63, writing the image data into the image display memory 59 via the image processing unit 58 or the memory control unit 57, and using the display control unit 60 to display the image data on the image display unit 5.

A shutter control unit 64 controls a shutter 53, and an aperture control unit 65 controls the aperture 52. A focus detecting unit 66 controls focusing of the lens unit 2, and a flash control unit 68 controls light emission of a flash 67.

The system controller 50 controls the entirety of the camera. The system controller 50 is formed by a microcomputer unit including a CPU (central processing unit), and executes programs stored in the memory 69.

The memory 69 is used to store constants, variables, programs, etc., for allowing the system controller 50 to operate. The memory stores various programs such as a program for executing the start and end of the help mode, a program for performing image pickup processing, a program for recording image file data created by an image processing program on a recording medium, and a program for reading image file data from a recording medium, and various control programs such as an OS (operating system) for realizing and executing a multitask configuration of the above programs.

The help data memory 70 stores help information to be displayed on the image display unit 5 when switch and dial operations (described later) are performed in the help mode.

A power supply control unit 71 includes a power supply detection circuit, a DC-DC converter, and a switch circuit for switching circuit blocks that supply power. The power supply control unit 71 detects whether a power supply is installed, a type of the power supply, and remaining battery power. By controlling the DC-DC converter on the basis of the results of detection and an instruction of the system controller 50, the power supply control unit 71 supplies power to portions including the recording medium 63 at necessary voltages in a necessary period.

Operating members 6, 8, 9, and 10 to 22 are used to input operation instructions to the system controller 50, and include switches and dials.

The operating members have the above-described functions. Specific relationships of the operating members with the help function are described below.

The help button 6 is used to issue help mode starting and terminating instructions. By operating the help button 6, the system controller 50 starts the help mode, which is stored in the memory 69. After that, by operating each of the operating members 8, 9, and 10 to 22, the system controller 50 displays, on the image display unit 5, help information corresponding to the operated operating member, the help information being stored in the help data memory 70. By further operating the help button 6 during the help mode, the system controller 50 finishes the help mode stored in the memory 69.

The mode dial switch 8 is used to switch on and off the main power of the camera, and to switch and set the full automatic mode and each photographing mode. By operating the mode dial switch 8 in the help mode, the image display unit 5 displays help information corresponding to a photographing mode, which matches the index 40 on the camera body side.

A half press of the release button 9 sets the release button 9 as SW1 to an ON state. The half press of the release button 9 issues instructions to initiate control operations such as AF control and AE control. A full press of the release button 9 sets the release button 9 as SW2 to an ON state. The full press of the release button 9 issues an instruction to initiate consecutive processing operations such as exposure processing in which a signal output from the image pickup element 54 is converted from analog to digital form, and the obtained image data is written in the memory 61, image processing in which the image stored in the memory 61 is processed by the image processing unit 58 and the processed image data is stored in the memory 61 again, and recording processing in which the information amount of the image stored in the memory 61 is compressed by the compression/decompression unit 62 and the compressed image data is written in the recording medium 63.

When the SW1 is turned on by operating the release button 9 during the help mode, help information concerning the half press is displayed on the image display unit 5. At the same time, light metering and focus detecting operations are actually performed, that is, operations of control such as AF control and AE control are performed. When the SW2 is turned on during the help mode, help information concerning the full press is displayed on the image display unit 5. At the same time, consecutive photographing operations, such as A/D conversion, exposure processing, image processing, and recording, are actually performed. The photographing operations during the help mode are described later.

The operating members 10 to 22 are used to set the state or operating conditions of the camera. By operating each of the operating members 10 to 22, in the help mode, help information concerning a function assigned to the operated operating member, a setting method, etc., is displayed on the image display unit 5.

Figure 5B:
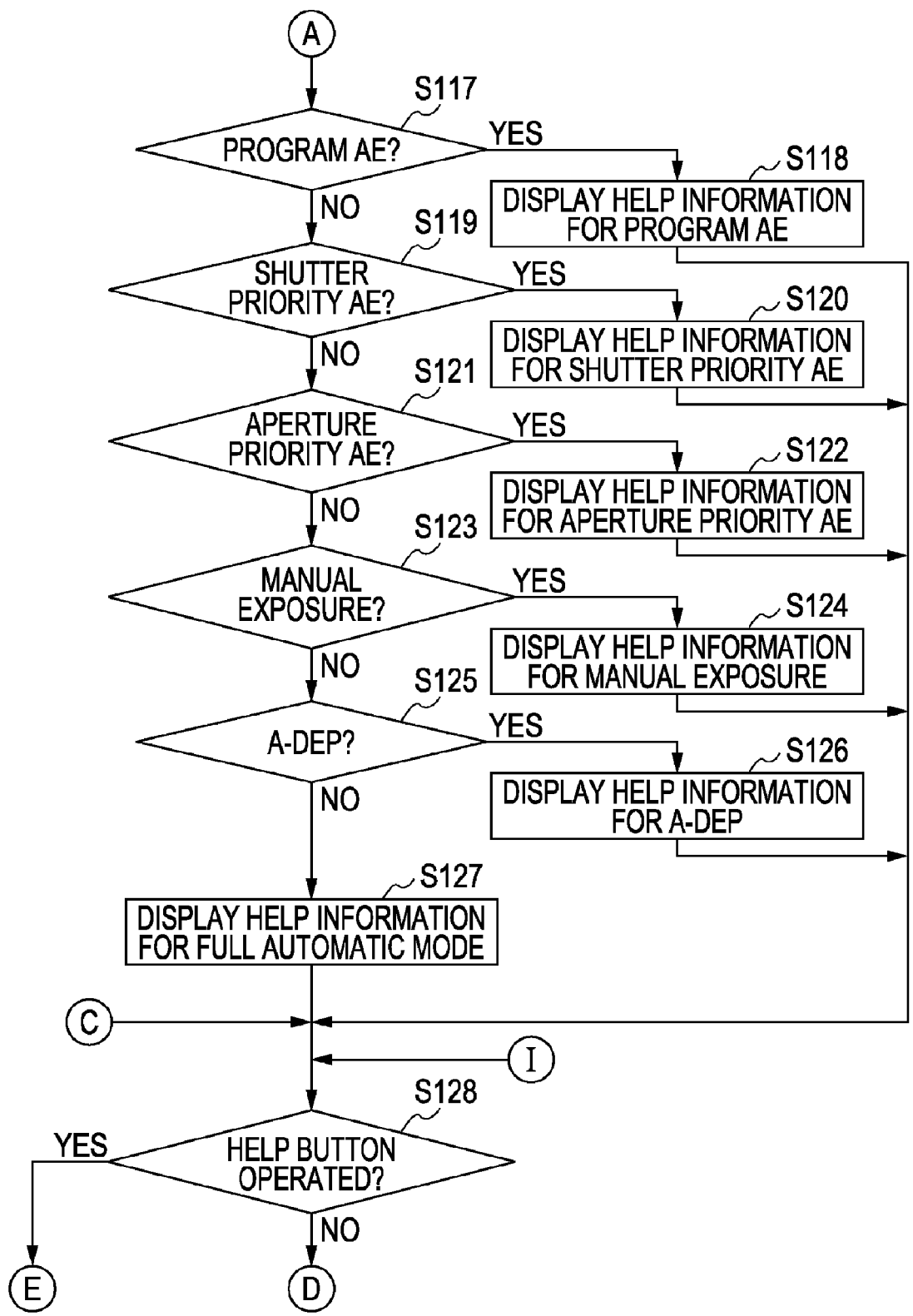
FIG. 5 is a flowchart showing an operation in a help mode of the camera according to the first embodiment.
Figures 6, 6A, 6B, 6C:
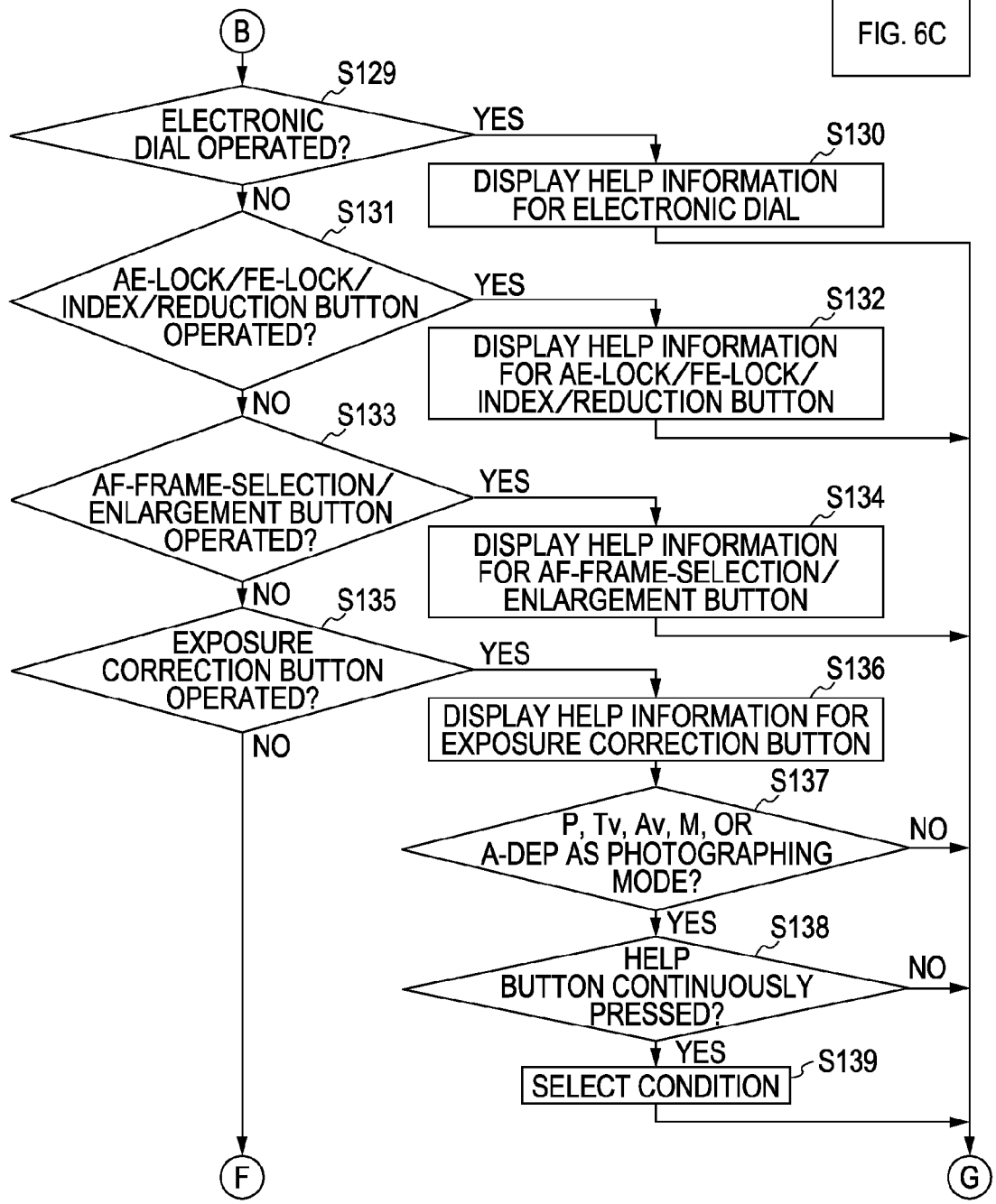
FIG. 6 is a flowchart showing an operation in the help mode of the camera according to the first embodiment.
Figure 7:
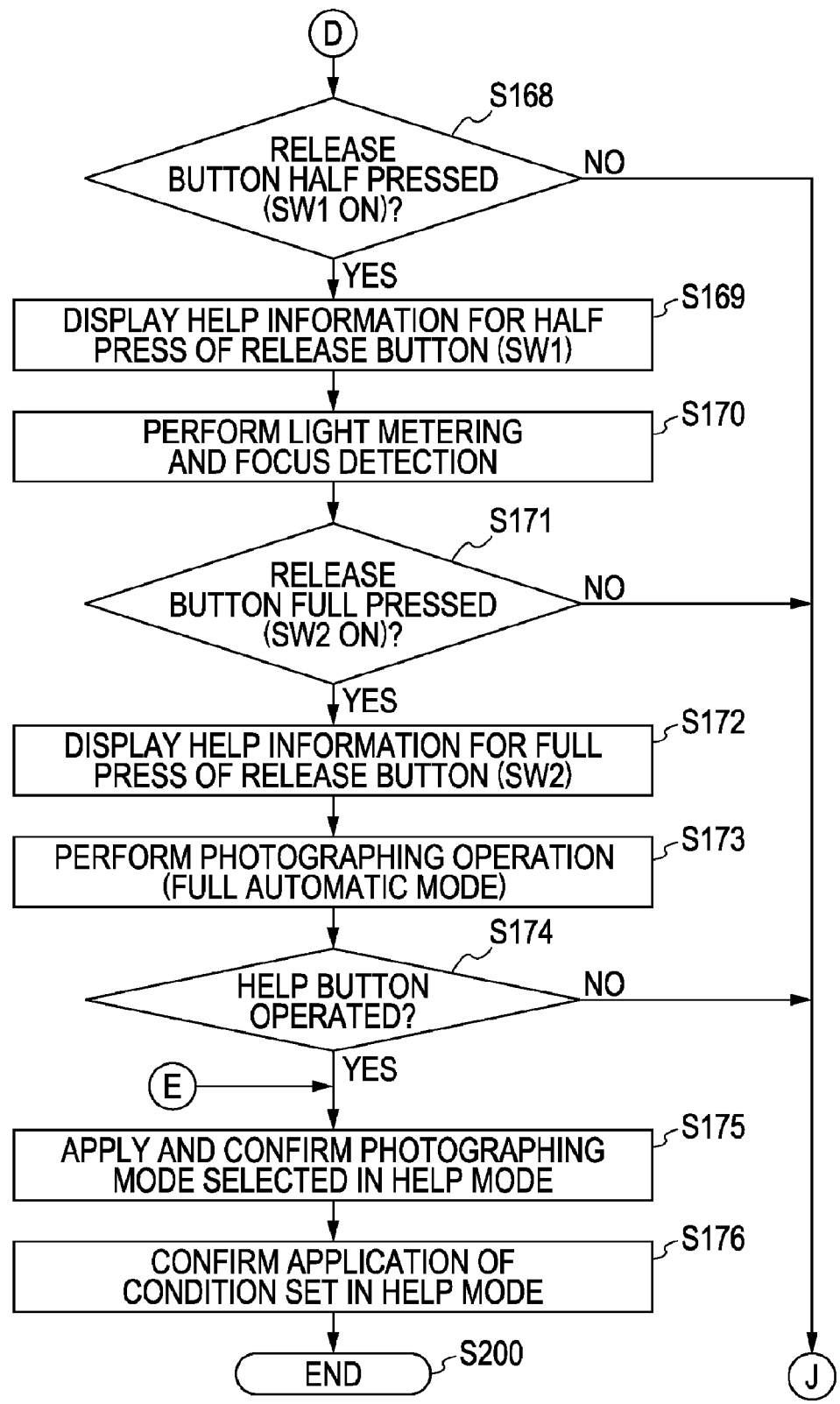
FIG. 7 is a flowchart showing an operation in the help mode of the camera according to the first embodiment.

FIGS. 5 to 7 are flowcharts illustrating the start and termination of the help mode by the system controller 50 (formed by the CPU or the like) in the main body 1, the operation of the camera when the above operating members are operated during the help mode, and the help information. The described help information is an example. Accordingly, other details may be displayed.

In step S100, the operation of the camera starts. If, in step S101, it is determined that the help button 6 has been operated, in step S102, the system controller 50 starts the help mode. In step S103, information indicating that the help mode is being activated is displayed on the image display unit 5. At this time, information concerning a method for finishing the help mode may be additionally displayed. If, in step S101, it is determined that the help button 6 has not been operated, the process proceeds to step S200, and the camera is on standby for awaiting a photographing operation or the like.

In step S104, it is determined whether the mode dial switch 8 has been operated.

Figure 8:
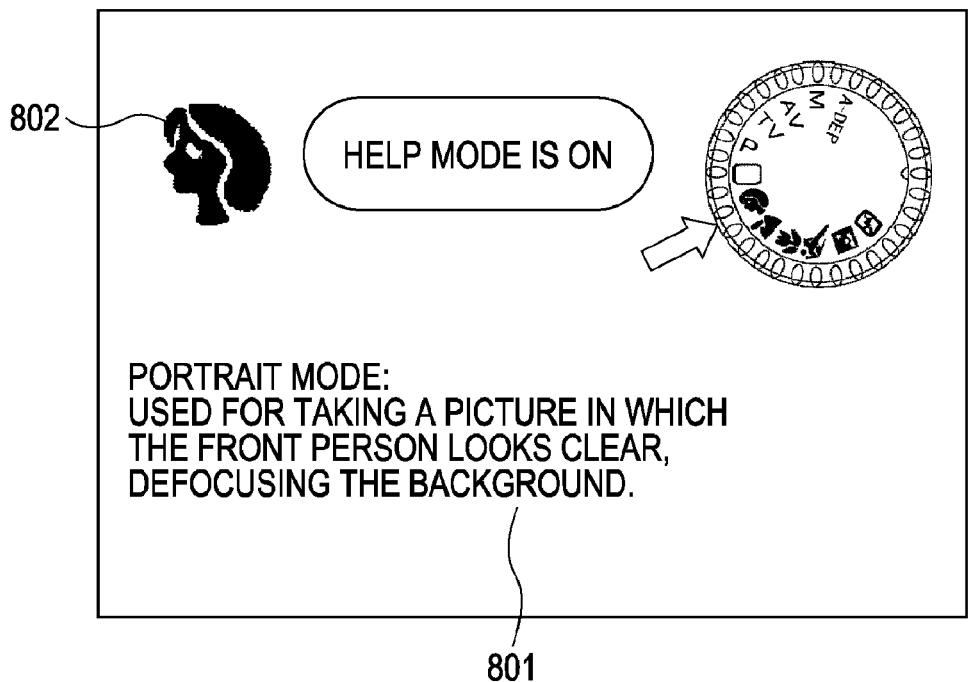
FIG. 8 is an illustration of an example of help information in the camera according to the first embodiment.

If, in step S104, it is determined that the mode dial switch 8 has been operated, in step S105 and it is determined whether a portrait mode has been selected. If, in step S105, it is determined that the portrait mode has been selected, the process proceeds to step S106, and help information concerning the portrait mode is displayed on the image display unit 5. Specifically, the help information at this time is displayed as shown in FIG. 8. As the help information, with text information 801 indicating that "PORTRAIT MODE: USED FOR TAKING A PICTURE IN WHICH THE FRONT PERSON LOOKS CLEAR, DEFOCUSING THE BACKGROUND", an icon 802 indicating the portrait mode, and an icon indicating that the help mode being activated, and an icon of the mode dial switch 8 are simultaneously displayed.

Referring back to the flowchart in FIG. 5, if, in step S105, it is determined that the portrait mode has not been selected, the process proceeds to step S107 and it is determined whether a landscape mode has been selected. If the landscape mode has been selected, the process proceeds to step S108 and help information concerning the landscape mode is displayed on the image display unit 5. A specific representation as the help information is the text information "LANDSCAPE MODE: USED FOR PHOTOGRAPHING A LANDSCAPE HAVING AN EXTENT AND A DEPTH". In addition, an icon indicating the landscape mode, an icon indicating that the help mode is being activated, and an icon of the operating member operated are displayed simultaneously with the text information.

If, in step S107, the landscape mode has not been selected, the process proceeds to step S109 and it is determined whether a close-up mode has been selected. If the close-up mode has been selected, the process proceeds to step S110, and help information concerning the close-up mode is displayed on the image display unit 5. A specific representation as the help information is the text information "CLOSE-UP MODE; USED FOR PHOTOGRAPHING IN MACRO VIEW, APPROACHING A PLANT OR INSECT". In addition, an icon indicating the close-up mode, an icon indicating that the help mode is being activated, and an icon of the operated operating member are displayed simultaneously with the text information.

If, in step S109, it is determined that the close-up mode has not been selected, the process proceeds to step S111, and it is determined whether a sport mode has been selected. If the sport mode has been selected, the process proceeds to step S112, and help information concerning the sport mode is displayed on the image display unit 5. A specific representation as the help information is the text information "SPORT MODE: USED FOR PHOTOGRAPHING A MOMENT OF A FAST MOVING OBJECT". In addition, an icon indicating the sport mode, an icon indicating that the help mode is being activated, and an icon of the operated operating member are displayed simultaneously with the text information.

If, in step S111, it is determined that the sport mode has not been selected, the process proceeds to step S113, and it is determined whether a night view portrait mode has been selected. If the night view portrait mode has been selected, the process proceeds to step S114, and help information concerning the night view portrait mode is displayed on the image display unit 5. A specific representation as the help information is the text information "NIGHT VIEW PORTRAIT MODE: USED FOR PHOTOGRAPHING A PERSON AGAINST THE BACKGROUND OF EVENING OR NIGHT VIEW". In addition, an icon indicating the night view portrait mode, an icon indicating that the help mode is being activated, and an icon of the operated operating member are displayed simultaneously with the text information.

If, in step S113, the night view portrait mode has not been selected, the process proceeds to step S115, and it is determined whether a flash emission prohibition mode has been selected. If the flash emission prohibition mode has been selected, the process proceeds to step S116, and help information of the flash emission prohibition mode is displayed on the image display unit 5. A specific representation as the help information is the text information "FLASH EMISSION PROHIBITION MODE: USED IN PLACES SUCH AS ART MUSEUMS WHERE FLASH PHOTOGRAPHING IS PROHIBITED, AND USED FOR PHOTOGRAPHING UTILIZING NATURAL LIGHT". In addition, an icon indicating the flash emission prohibition mode, an icon indicating that the help mode is being activated, and an icon of the operated operating member are displayed simultaneously with the text information.

If, in step S115, it is determined that the flash emission prohibition mode has not been selected, the process proceeds to step S117, and it is determined whether a program AE mode has been selected. If the program AE mode has been selected, the process proceeds to step S118, and help information concerning the program AE mode is displayed on the image display unit 5. A specific representation as the help information is the text information "(P) PROGRAM AE MODE: TURN ELECTRONIC DIAL TO SHIFT EXPOSURE SETTINGS". In addition, an icon indicating the program AE mode, an icon indicating that the help mode is being activated, and an icon of the operated operating member are displayed simultaneously with the text information.

If the program AE mode has not been selected, the process proceeds to step S119, and it is determined whether a shutter priority AE mode has been selected. If the shutter priority AE mode has been selected, the process proceeds to step S120, help information concerning the shutter priority AE mode is displayed on the image display unit 5. A specific representation as the help information is the text information "(Tv) SHUTTER PRIORITY AE MODE: SET SHUTTER SPEED FOR PHOTOGRAPHING WITH ELECTRONIC DIAL". In addition, an icon indicating the shutter priority AE mode, an icon indicating that the help mode is being activated, and an icon of the operated operating member are displayed simultaneously with the text information.

If the shutter priority AE mode has not been selected, the process proceeds to step S121, it is determined whether an aperture priority AE mode has been selected. If the aperture priority AE mode has been selected, the process proceeds to step S122, and help information concerning the aperture priority AE mode is displayed on the image display unit 5. A specific representation as the help information is the text information "(Av) APERTURE PRIORITY AE MODE: SET APERTURE VALUE FOR PHOTOGRAPHING WITH ELECTRONIC DIAL". In addition, an icon indicating the aperture priority AE mode, an icon indicating that the help mode is being activated, and an icon of the operated operating member are displayed simultaneously with the text information.

If the aperture priority AE mode has not been selected, the process proceeds to step S123, and it is determined whether a manual exposure mode has been selected. If the manual exposure mode has been selected, the process proceeds to step S124, and help information concerning the manual exposure mode is displayed on the image display unit 5. A specific representation as the help information is the text information "(M) MANUAL EXPOSURE MODE: USED FOR DETERMINING SHUTTER SPEED AND APERTURE VALUE TO PRODUCE A DESIRED PHOTO". In addition, an icon indicating the manual exposure mode, an icon indicating that the help mode is being activated, and an icon of the operated operating member are displayed simultaneously with the text information.

If the manual exposure mode has not been selected, the process proceeds to step S125, and it is determined whether an A-DEP mode has been selected. If the A-DEP mode has been selected, the process proceeds to step S126, and help information concerning the A-DEP mode is displayed on the image display unit 5. A specific representation as the help information is the text information "(A-DEP) AUTO DEPTH MODE: CAMERA SETS APERTURE VALUE AND FOCUSING POSITION SO THAT OBJECTS CAPTURED AT FOCUS DETECTING POINTS CAN BE FOCUSED". In addition, an icon indicating the A-DEP mode, an icon indicating that the help mode is being activated, and an icon of the operated operating member are displayed simultaneously with the text information.

If the A-DEP mode has not been selected, the process proceeds to step S127, help information concerning the full automatic mode is displayed on the image display unit 5. A specific representation as the help information is the text information "FULL AUTOMATIC MODE: PRESS RELEASE BUTTON TO EASILY TAKE CLEAR PICTURE". In addition, an icon indicating the full automatic mode, an icon indicating that the help mode is being activated, and an icon of the operated operating member are displayed simultaneously with the text information.

After the help information for each mode is displayed, the process proceeds to step S128. In step S128, it is determined whether the help button 6 has been operated. Steps following step S128 are described later with reference to FIG. 7.

A case in which it is determined in step S104 that the mode dial switch 8 has not been operated is described below with reference to the flowchart in FIG. 6.

Figure 9:
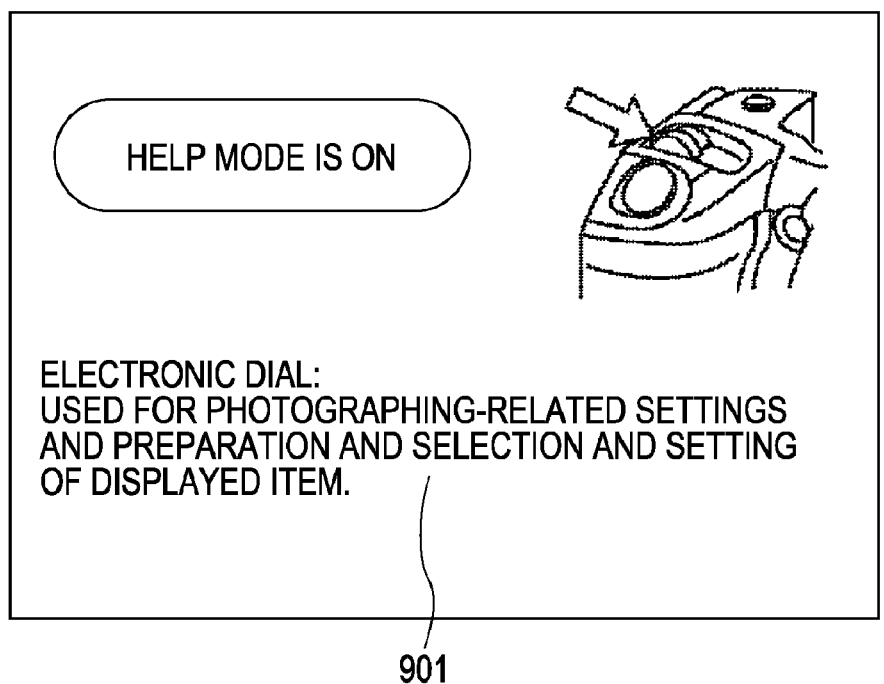
FIG. 9 is an illustration of an example of help information in the camera according to the first embodiment.

If, in step S104, it is determined that the mode dial switch 8 has not been operated, the process proceeds to step S129, and it is determined whether the electronic dial 10 has been operated. If the electronic dial 10 has been operated, the process proceeds to step S130, and help information concerning the electronic dial 10 is displayed on the image display unit 5. The help information at this time is displayed as shown in FIG. 9. The help information includes the text information 901 "ELECTRONIC DIAL: USED FOR SETTING PHOTOGRAPHY SETTINGS AND PREPARATION AND SELECTION OF AND SETTINGS RELATED TO A DISPLAYED ITEM". In addition, an icon indicating that the help mode is being activated, and an icon of the electronic dial 10 are displayed simultaneously with the text information 901.

If, in step S129, it is determined that the electronic dial 10 has not been operated, the process proceeds to step S131, and it is determined whether the AE-lock/FE-lock/index/reduction button 11 has been operated. If the AE-lock/FE-lock/index/reduction 11 has been operated, the process proceeds to step S132, and help information concerning the AE-lock/FE-lock/index/reduction 11 is displayed on the image display unit 5. A specific representation as the help information is the text information "[IN PHOTOGRAPHING] USED AS AE LOCK BUTTON: DISPLAYS THE MARK "*" AND FIXES EXPOSURE VALUE (AE LOCK); FOR PHOTOGRAPHING WITH FLASH, USED AS FE LOCK BUTTON: PERFORMS PHOTOGRAPHING WITH FLASH IN WHICH FLASH IS CONTROLLED TO ALLOW A PORTION OF OBJECT TO BE CORRECTLY ILLUMINATED; [IN PLAYBACK] USED AS INDEX AND REDUCED IMAGE DISPLAY BUTTON; PERFORMS IMAGE DISPLAY IN INDEX-AND-REDUCED FORM FOR DISPLAYING NINE IMAGES ON ONE SCREEN". In addition, an icon indicating that the help mode is being activated, and an icon of the AE-lock/FE-lock/index/reduction 11 are displayed simultaneously with the text information. As described above, when a plurality of functions are assigned to an operating member, help information concerning all the functions may be displayed. Also, when the same operating member is consecutively pressed, for example, the help information "[IN PHOTOGRAPHING]" and the help information "[IN PLAYBACK]" may be displayed with both switched.

If, in step S131, it is determined the AE-lock/FE-lock/index/reduction 11 has not been operated, the process proceeds to step S133, and it is determined whether the AF frame selection/enlargement button 12 has been operated. If the AF frame selection/enlargement button 12 has been operated, the process proceeds to step S134, and help information concerning the AF frame selection/enlargement button 12 is displayed on the image display unit 5. This operating member has a plurality of functions in both a state with the camera being use for photography and a state with the camera being used for playback. Accordingly, a specific representation as the help information is the text information "[IN PHOTOGRAPHING] USED AS AF FRAME SELECTION BUTTON: PRESS BUTTON BEFORE SELECTING AF FRAME WITH ELECTRONIC DIAL; [IN PLAYBACK] USED AS IMAGE ENLARGING BUTTON: DISPLAY ENLARGED IMAGE". In addition, an icon indicating that the help mode is being activated, and an icon of the AF frame selection/enlargement button 12 are displayed simultaneously with the text information.

If, in step S133, it is determined that the AF frame selection/enlargement button 12 has not been operated, the process proceeds to step S135, and it is determined whether the exposure correction button 13 has been operated. If the exposure correction button 13 has been operated, the process proceeds to step S136, and help information concerning the exposure correction button 13 is displayed on the image display unit 5. Since setting of exposure correction differs depending on a type of photographing mode, text information as specific representations is as follows. When the photographing mode is one of P, Tv, Av, and A-DEP, the image display unit 5 displays the text information "EXPOSURE CORRECTION BUTTON: SET DESIRED EXPOSURE VALUE BY TURNING ELECTRONIC DIAL WHILE PRESSING THIS BUTTON; and CONTINUOUSLY PRESS HELP BUTTON FOR SETTING". When the photographing mode is M, the image display unit 5 displays the text information "MANUAL APERTURE SETTING BUTTON: SET DESIRED Av BY TURNING ELECTRONIC DIAL WHILE PRESSING THIS BUTTON and CONTINUOUSLY PRESS HELP BUTTON FOR SETTING". For the modes whose mode marks appear in image zone of the mode dial switch, the image display unit

5 displays the text information "EXPOSURE CORRECTION/MANUAL APERTURE SETTING BUTTON: UNABLE TO SET ANY VALUE IN THIS PHOTOGRAPHING MODE".

Figure 10A:
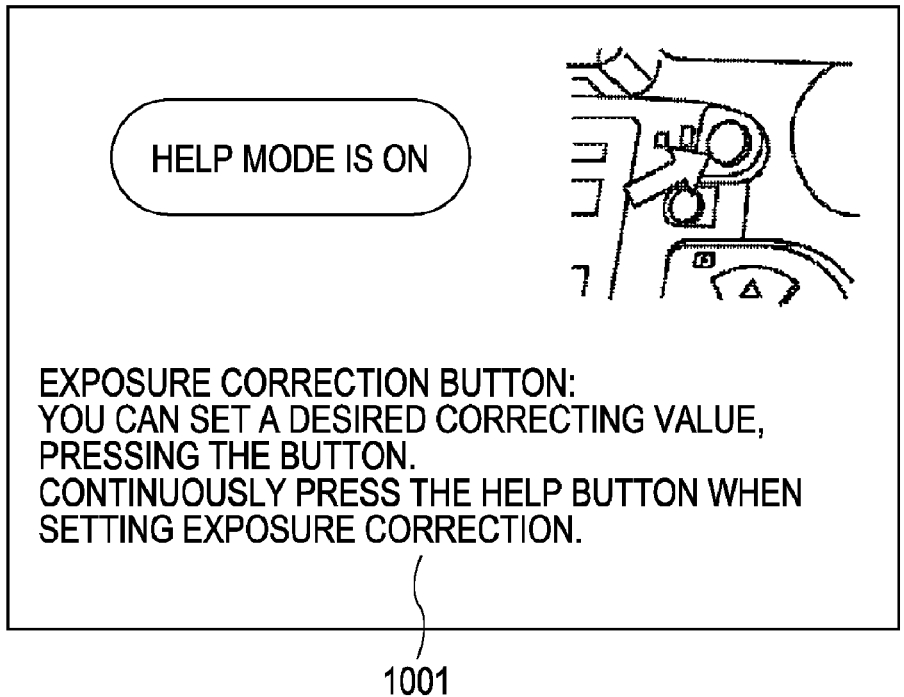
FIG. 10A is an illustration of an example of help information in the camera according to the first embodiment.
Figure 10B:
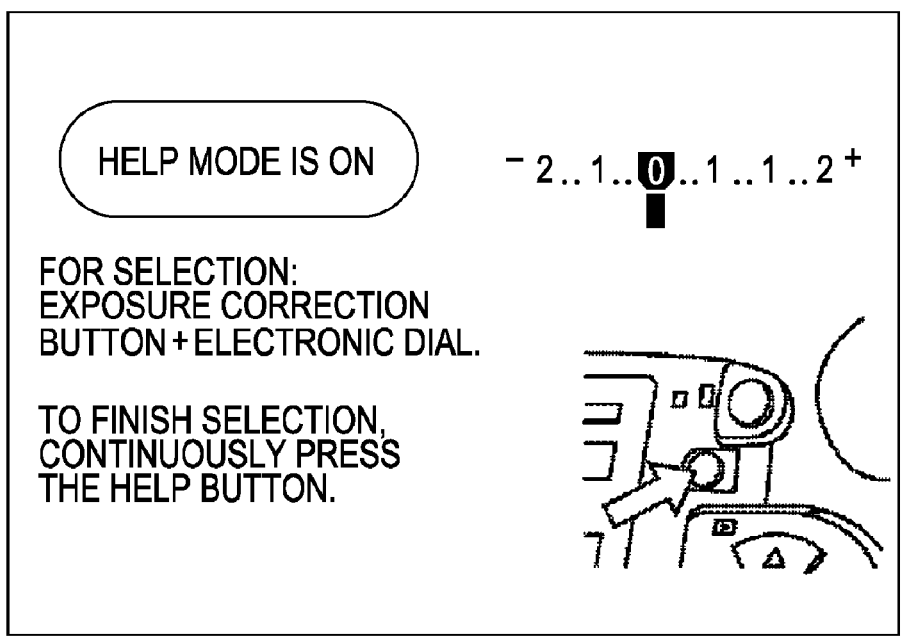
FIG. 10B is an illustration of an example of help information in the camera according to the first embodiment.

Proceeding to step S137, when the photographing mode is one of P, Tv, Av, M, and A-DEP, in step S138, it is determined whether the help button 6 has continuously been operated. If the help button 6 has continuously been operated, in step S139, a condition can be selected by receiving a normal exposure correcting operation or an aperture setting operation. However, at this time, the selected condition is not applied, and is applied in step S176 (described later). When the photographing mode is P, an example of help information is displayed as shown in FIG. 10A. The help information includes text information 1001. In addition, an icon indicating that the help mode being activated, and an icon of the exposure correction button 13 are displayed simultaneously with the text information. If the help button 6 has continuously been operated, the help information is displayed as shown in FIG. 10B. In this case, a condition for exposure correction can be selected by receiving the normal exposure correcting operation. An operation method for finishing the setting is simultaneously displayed. After that, the process proceeds to step S128. If, in step S137, it is determined that the photographing mode is not one of P, Tv, Av, M, and A-DEP, and, if, in step S138, it is determined that the help button has not continuously been operated, the process directly proceeds to step S128.

If, in step S135, the exposure correction button has not been operated, the process proceeds to step S140, and it is determined whether the cross key (left) 14 has been operated. If the cross key (left) 14 has been operated, the process proceeds to step S141, and help information concerning the cross key (left) 14 is displayed on the image display unit 5. A specific representation as the help information is the text information "CROSS KEY (LEFT): USED FOR CAMERA SETTINGS AND ITEM SELECTION". In addition, an icon indicating that the help mode is being activated, and an icon of the cross key (left) 14 are displayed simultaneously with the text information.

If, in step S140, it is determined that the cross key (left) 14 has not been operated, the process proceeds to step S142, and it is determined whether the cross key (right) 15 has been operated. If the cross key (right) 15 has been operated, the process proceeds to step S143, help information concerning the cross key (right) 15 is displayed on the image display unit 5. A specific representation as the help information is the text information "CROSS KEY (RIGHT): USED FOR CAMERA SETTINGS AND ITEM SELECTION". In addition, an icon indicating that the help mode being activated, and an icon of the cross key (right) 15 are displayed simultaneously with the text information.

If, in step S142, it is determined that the cross key (right) 15 has not been operated, the process proceeds to step S144, and it is determined whether the ISO Speed Rating setting button 16 has been operated. If the ISO Speed Rating setting button 16 has been operated, the process proceeds to step S145, and help information concerning the ISO Speed Rating setting button 16 is displayed on the image display unit 5. This operating member has a plurality of functions in the overall camera functions and in photographing. Accordingly, a specific representation as the help information is the text information "[OVERALL] CROSS KEY (UPWARD): USED FOR CAMERA SETTINGS AND ITEM SELECTION; [IN PHOTOGRAPHING] ISO SPEED RATING SETTING BUTTON: SETS DESIRED SPEED RATING VALUE BY TURNING ELECTRONIC DIAL; FOR SETTING: CONTINUOUSLY PRESS HELP BUTTON".

Next, proceeding to step S146, if the photographing mode is one of P, Tv, Av, M, and A-DEP, in step S147, it is determined whether the help button 6 has continuously been operated. If the help button 6 has continuously been operated, in step S148, a condition can be selected by receiving a normal ISO Speed Rating setting operation. However, the selected condition is not applied at this time, and is applied in step S176 (described later). In addition, an operation method for finishing the setting is simultaneously displayed. After that, the process proceeds to step S128. If, in step S146, it is determined that the photographing mode is not one of P, Tv, Av, M, and A-DEP, and, if, in step S147, it is determined that the help button has not been continuously operated, the process directly proceeds to step S128.

If, in step S144, it is determined that the ISO Speed Rating setting button 16 has not been operated, the process proceeds to step S149, and it is determined whether the cross key (downward)/white balance setting button 17 has been operated. If the cross key (downward)/white balance setting button 17 has been operated, the process proceeds to step S150, and help information concerning the cross key (downward)/white balance setting button 17 is displayed on the image display unit 5. This operating member has a plurality of functions in the overall camera function and in photography. Accordingly, a specific representation as the help information is the text information "[OVERALL] CROSS KEY (DOWNWARD): USED FOR CAMERA SETTINGS AND ITEM SELECTION; [IN PHOTOGRAPHING] WHILE BALANCE SETTING BUTTON: SETS DESIRED WHITE BALANCE BY TURNING ELECTRONIC DIAL; FOR SETTING: CONTINUOUSLY PRESS HELP BUTTON".

Next, proceeding to step S151, if the photographing mode is one of P, Tv, Av, M, and A-DEP, in step S152, it is determined whether the help button 6 has continuously been operated. If the help button 6 has continuously been operated, in step S153, a condition can be selected by receiving a normal white balance setting operation. However, the selected condition is not applied at this time, and is applied in step S176 (described later). In addition, an operation method for finishing the setting is simultaneously displayed. After that, the process proceeds to step S128. If, in step S151, it is determined that the photographing mode is not one of P, Tv, Av, M, and A-DEP, and, if, in step S152, it is determined that the help button 6 has not continuously been operated, the process directly proceeds to step S128.

If, in step S149, it is determined that the cross key (downward)/white balance setting button 17 has not been operated, in step S154, it is determined whether the setting button 18 has been operated. If the setting button 18 has been operated, the process proceeds to step S155, and help information concerning the setting button 18 is displayed on the image display unit 5. A specific representation as the help information is the text information "SETTING BUTTON: DETERMINES SETTINGS OF CAMERA AND ITEM SELECTION". In addition, an icon indicating that the help mode being activated, and an icon of the setting button 18 are displayed simultaneously with the text information.

If, in step S154, it is determined that the setting button 18 has not been operated, in step S156, it is determined whether the menu button 19 has been operated. If the menu button 19 has been operated, the process proceeds to step S157, and help information concerning the menu button 19 is displayed on the image display unit 5. A specific representation as the help information is the text information "MENU BUTTON: SETS VARIOUS ITEMS SUCH AS RECORDING IMAGE

QUALITY AND DATE/TIME; FOR SETTING: CONTINUOUSLY PRESS HELP BUTTON".

Next, in step S158, it is determined whether the help button 6 has continuously been operated. If the help button 6 has continuously been operated, in step S159, a condition can be selected by receiving a normal menu operation. However, at this time, the selected condition is not applied, and is applied in step S176 (described later). In addition, an operation method for finishing the setting is simultaneously displayed. After that, the process proceeds to step S128. If, in step S158, it is determined that the help button 6 has not continuously been operated, the process directly proceeds to step S128.

If, in step S156, it is determined that the menu button 19 has not been operated, in step S160, it is determined whether the info button 20 has been operated. If the info button 20 has been operated, in step S161, help information concerning the info button 20 is displayed on the image display unit 5. A specific representation as the help information is the text information "[IN PHOTOGRAPHING] DISPLAYS DETAILED PHOTOGRAPHING CONDITIONS PRESENTLY SET IN CAMERA; [IN PLAYBACK] DISPLAYS PHOTOGRAPHING INFORMATION OF RECORDED IMAGES". In addition, an icon indicating that the help mode being activated, and an icon of the info button 20 are displayed simultaneously with the text information.

If, in step S160, it is determined that the info button 20 has not been operated, in step S162, it is determined whether the jump button 21 has been operated. If the jump button 21 has been operated, in step S163, help information concerning the jump button 21 is displayed on the image display unit 5. A specific representation as the help information is the text information "JUMP BUTTON: DISPLAYS EACH SET OF PREDETERMINED NUMBER OF IMAGES FOR SINGLE IMAGE DISPLAY, IMAGE INFORMATION DISPLAY, AND ENLARGED IMAGE DISPLAY". In addition, an icon indicating that the help mode being activated, and an icon of the jump button 21 are displayed simultaneously with the text information.

If, in step S162, it is determined that the jump button 21 has not been operated, in step S164, it is determined whether the playback button 22 has been operated. If the playback button 22 has been operated, in step S165, help information concerning the playback button 22 is displayed on the image display unit 5. A specific representation as the help information is the text information "PLAYBACK BUTTON: USED FOR SELECTING AND VIEWING IMAGES OBTAINED BY PHOTOGRAPHING". In addition, an icon indicating that the help mode being activated, and an icon of the playback button 22 are displayed simultaneously with the text information.

If, in step S164, it is determined that the playback button 22 has not been operated, in step S166, it is determined whether the image erasing button 23 has been operated. If the image erasing button 23 has been operated, in step S167, help information concerning the image erasing button 23 is displayed on the image display unit 5. A specific representation as the help information is the text information "IMAGE ERASING BUTTON: ERASE ONE IMAGE, OR ALL IMAGES RECORDED IN CF CARD". In addition, an icon indicating that the help mode being activated, and an icon of the image erasing button 23 are displayed simultaneously with the text information.

If, in step S166, it is determined that the image erasing button 23 has not been operated, the process proceeds to step S128.

Next, a process in which the photographing operation is performed by operating the release button 9 from step S128 in FIG. 5 during the help mode is described below with reference to FIG. 7.

Figure 11A:
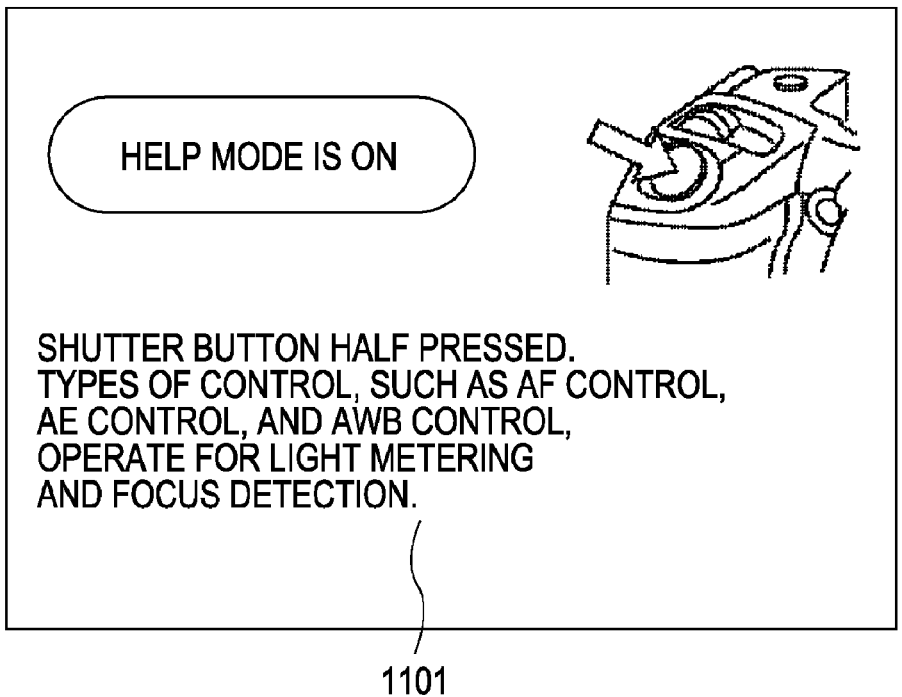
FIG. 11A is an illustration of an example of help information in the camera according to the first embodiment.

If, in step S128, it is determined the help button 6 has not been operated, the process proceeds to step S168, and it is determined whether the release button 9 has been half pressed (SW1). If the release button 9 has been half pressed (SW1), in step S169, help information concerning the half press (SW1) of the release button 9 is displayed on the image display unit 5. The help information at this time is as shown in FIG. 11A. The help information includes text information 1101. The text information 1101 is specifically the text "SHUTTER BUTTON HALF PRESSED. TYPES OF CONTROL, SUCH AS AF CONTROL, AE CONTROL, AND AWB CONTROL, OPERATE FOR LIGHT METERING AND FOCUS DETECTION". In addition, in step S169, the help information is displayed, and, in step S170, types of control, such as AF control and AE control, operate to perform light metering and focus detection.

Figure 11B:
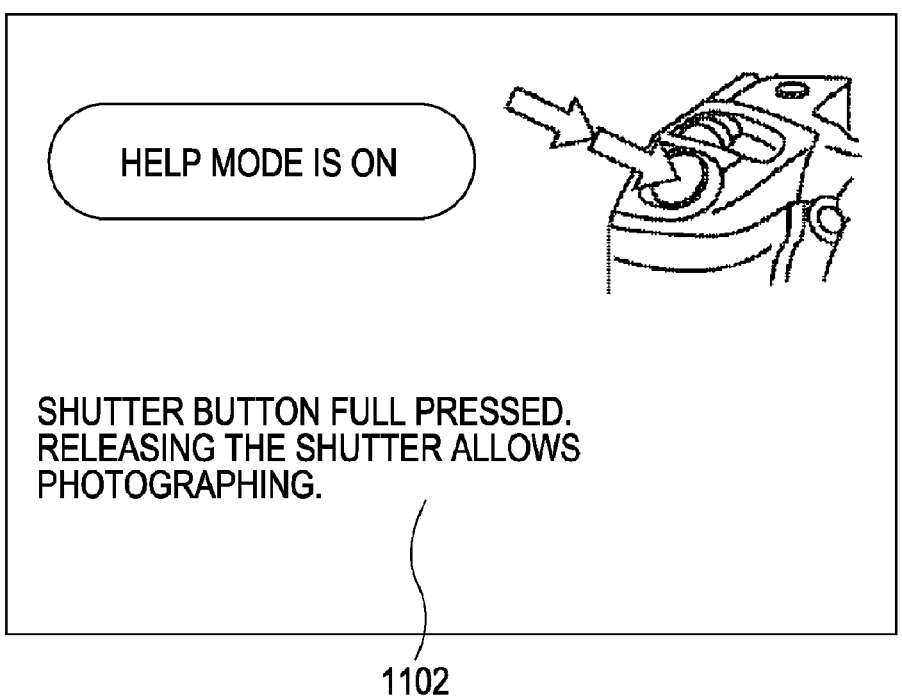
FIG. 11B is an illustration of an example of help information in the camera according to the first embodiment.

Proceeding to step S171, it is determined whether the release button 9 has been full pressed (SW2). If the release button 9 has been full pressed (SW2), in step S172, help information concerning the full press (SW2) of the release button 9 is displayed on the image display unit 5. The help information at this time is as shown in FIG. 11B. The help information includes text information 1102. The text information 1102 is specifically the text "SHUTTER BUTTON FULL PRESSED. RELEASING SHUTTER ALLOWS PHOTOGRAPHING". In addition, in step S172, the help information is displayed and, at the same time, in step S173, the photographing operation is performed by actually releasing the shutter. Even after releasing the shutter, the help information is left displayed. In this case, photographing is performed under photographing conditions that are full automatically set by the camera. Accordingly, even if condition selection by operating each operating member during the help mode has not finished yet, and, even if the help mode does not finish, photographing under photographer's unintended conditions can be prevented, thus enabling good photographing in any situation. In addition, after performing predetermined processing (such as processing by the image processing unit 58 and processing the compression/decompression unit 62) on image data, the processed image data is recorded as an image file on the recording medium 63.

Next, proceeding to step S174, it is determined whether the help button 6 has been operated. If the help button 6 has been operated, in step S175, the photographing mode selected by the mode dial switch 8 is applied to the camera, and application of the set photographing mode is displayed on the image display unit 5 for photographer's confirmation. In other words, regarding an operating member, such as the mode dial switch 8, in which the position of the operating member determines each setting, the image display unit 5 displays that the setting has been applied to the camera.

Proceeding to step S176, the camera state or operating condition set during the help mode is displayed on the image display unit 5 for confirmation, whereby the photographer can select whether to apply the displayed state or condition. When the selected condition is not applied, a state or operating condition immediately before starting the help mode is applied to all or part of the camera state or operating condition. However, a state or condition that is automatically determined depending the photographing mode may be displayed.

After that, proceeding to step S200, the help mode finishes, and the camera is on standby awaiting an operation such as the photographing mode.

If it is determined in step S168 that release button 9 has not been half pressed, if it is determined in step S171 that the release button 9 has not been fully pressed, and, if it is determined in step S174 that the help button 6 has not been operated, the process returns to step S104 shown in FIG. 5.

In addition, if, in step S128, it is determined that the help button 6 has been operated, steps S175, S176, and S200 are executed to perform an operation similar to the above operation, whereby the help mode finishes and the camera is on standby awaiting the photographing operation or the like.

In the first embodiment, the help button 6 is continuously pressed as an action for proceeding to selecting the camera state or operating condition. However, a selection may be made by pressing a different button.

Second Embodiment

Next, a second embodiment of the present invention is described below. A camera according to the second embodiment is identical in configuration to that according to the first embodiment. Accordingly, identical components are not described since they are denoted by identical reference numerals in the first embodiment. The second embodiment has a feature to control when the camera is instructed to perform photographing while the help mode is being executed.

In connection with FIGS. 5, 6, and 7 showing the first embodiment, FIG. 12 is a flowchart illustrating the start and end of a help mode by the system controller 50 (including the CPU) in the main body 1, and a camera operation and help information in a case in which each operating member is operated during the help mode. Since the illustrated help information is an example, other information may be displayed.

Processing, from step S100 (FIG. 5) in which the camera operation starts through step S128 (FIG. 5) in which it is determined whether the help button 6 has been operated, is not described since the steps are identical to those in the first embodiment. In the second embodiment, in step S103, information indicating that the help mode is being activated is displayed on the image display unit 5, and photographing conditions immediately before the help mode is activated is stored in the memory 61.

Next, a case in which it is determined in step S128 in FIG. 5 that the help button 6 has not been operated is described below with reference to FIG. 12.

If, in step S128, it is determined that the help button 6 has not been operated, the process proceeds to step S268, and it is determined whether the release button 9 has been half pressed (SW1). If the release button 9 has been half pressed (SW1), in step S269, help information concerning the half press (SW1) of the release button 9 is displayed on the image display unit 5. The help information at this time is displayed similarly to the case of the first embodiment. In addition, in step S269, the help information is displayed, and, at the same time, in step S270, types of control, such as AF control and AE control, operates to perform light metering and focus detection.

Proceeding to step S271, it is determined whether the release button 9 has been full pressed (SW2). If the release button 9 has been full pressed (SW2), in step S272, help information concerning the full press of the release button 9 is displayed on the image display unit 5. The help information at this time is displayed similarly to the case of the first embodiment. In addition, in step S272, the help information is displayed, and, at the same time, in step S273, the photographing operation is performed by actually releasing the shutter. Even after releasing the shutter, the help information is left displayed. In this case, photographing is performed under photographing conditions immediately before starting the help mode which are stored in the memory 61. The photographing conditions include, for example, the photographing mode set by using the mode dial switch 8, a shutter speed, an aperture, and a correction value. Accordingly, even if condition selection by operating each operating member during the help mode has not finished yet, and, even if the help mode does not finish, photographing can be quickly performed under conditions closer to photographer's preferences. In addition, after performing predetermined processing (such as processing by the image processing unit 58 and processing the compression/decompression unit 62) on image data, the processed image data is recorded as an image file on the recording medium 63.

Proceeding to step S274, it is determined whether the help button 6 has been operated. If the help button 6 has been operated, in step S275, the photographing mode selected by the mode dial switch 8 is applied to the camera, and application of the set photographing mode is displayed on the image display unit 5 for photographer's confirmation. In other words, regarding an operating member, such as the mode dial switch 8, in which the position of the operating member determines each setting, the image display unit 5 displays that the setting has been applied to the camera.

Proceeding to step S276, the camera state or operating condition set during the help mode is displayed on the image display unit 5 for confirmation, whereby the photographer can select whether to apply the displayed state or condition. When the selected condition is not applied, a state or operating condition immediately before starting the help mode is applied to all or part of the camera state or operating condition. However, a state or condition that is automatically determined depending the photographing mode may be displayed.

After that, proceeding to step S300, the help mode finishes, and the camera is on standby awaiting an operation such as the photographing mode.

If it is determined in step S268 that release button 9 has not been half pressed, if it is determined in step S271 that the release button 9 has not been fully pressed, and, if it is determined in step S274 that the help button 6 has not been operated, the process returns to step S104 shown in FIG. 5.

In addition, if, in step S128, it is determined that the help button 6 has been operated, steps S275, S276, and S300 are executed to perform an operation similar to the above operation, whereby the help mode finishes and the camera is on standby awaiting the photographing operation or the like.

In the second embodiment, the help button 6 is continuously pressed as an action for proceeding to selecting the camera state or operating condition. However, a selection may be made by pressing a different button.

Other Embodiments

Objects of the above-described embodiments can be achieved also by the following method. Specifically, a recording medium on which program code of software for realizing functions of each embodiment is recorded is supplied to an apparatus. A computer (CPU or MPU) included in the apparatus loads and executes the program code recorded on the recording medium. In this case, the program code itself loaded from the recording medium realizes the functions of the embodiment. Accordingly, the recording medium on which the program code is recoded is included in the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-052934 filed Feb. 28, 2006, which is hereby incorporated by reference herein in its entirety.

What is claimed is:

1. An image pickup apparatus having a help function, the image pickup apparatus comprising:
a mode dial that sets a mode of the image pickup apparatus to one of a plurality of photographing modes;
a setting unit that sets, not in a help mode, the photographing mode to a photographing mode corresponding to a turned position of the mode dial in accordance with the turning of the mode dial;
a display unit that displays information concerning the image pickup apparatus;
a start instruction unit that instructs the image pickup apparatus to start its operation at a help mode;
a control unit that controls, during the operation of the image pickup apparatus at the help mode, the display unit to display an explanation indicating the photographing mode corresponding to a turned position of the mode dial without actually changing the photographing mode to a photographing mode corresponding to a turned position of the mode dial in response to the turning of the mode dial;
a release unit that instructs the image pickup apparatus to perform photographing;
a photographing control unit that, when the release unit instructs the image pickup apparatus to perform photographing during the help mode, executes a photographing operation under a predetermined photographing mode regardless of the operation by the mode dial after the help mode is started; and
a termination instruction unit that terminates the help mode,
wherein the setting unit sets, to the image pickup apparatus, when the termination instruction terminates the help mode, the photographing mode corresponding to the turned position of the mode dial which was turned during the help mode.

2. The image pickup apparatus according to claim 1, wherein the predetermined photographing mode is photographing mode being fully automatically set by the image pickup apparatus depending on circumstances of an object.

3. The image pickup apparatus according to claim 1, wherein the predetermined photographing mode are photographing mode being set in the image pickup apparatus immediately before the start instruction unit instructs the help mode to start.

4. The image pickup apparatus according to claim 1, further comprising a selection unit that selects, as the predetermined photographing mode, between application of a photographing mode being set in the image pickup apparatus immediately before the help mode is started by the start instruction unit, and application of the photographing mode corresponding to the turned position of the mode dial during the help mode,
wherein the setting unit sets the particular state or operating condition in response to an output from the selection unit.

5. An image pickup apparatus according to claim 1, wherein the help mode is not terminated even if the image pickup apparatus is instructed to perform photographing by the release unit and the photographing is performed by the photographing control unit during the help mode.

6. A method for controlling an image pickup apparatus having a help mode for displaying, on a display unit, representations illustrating states or operating conditions set by operating a plurality of operating members, the method comprising the steps of:
setting a mode of the image pickup apparatus to one of a plurality of photographing modes;
setting, not in a help mode, the photographing mode to a photographing mode corresponding to a turned position of the mode dial in accordance with the turning of the mode dial;
starting the help mode;
displaying, on the display unit an explanation indicating the photographing mode corresponding to a turned position of the mode dial without actually changing the photographing mode to a photographing mode corresponding to a turned position of the mode dial in response to the turning of the mode dial;
when the image pickup apparatus is instructed by a release unit to perform photographing, executing a photographing operation under a predetermined photographing mode regardless of the operation by the mode dial after the help mode is started; and
terminating the help mode,
when the termination instruction terminates the help mode, the photographing mode corresponding to the turned position of the mode dial which was turned during the help mode.

7. The method according to claim 6, wherein the predetermined photographing mode in the step of executing the photographing operation is photographing mode being fully automatically set by the image pickup apparatus depending on circumstances of an object.

8. The method according to claim 6, wherein the predetermined photographing mode in the step of executing the photographing operation are photographing mode being set in the image pickup apparatus immediately before the help mode is started.

9. The method according to claim 6, further comprising the step of selecting, as the predetermined photographing mode a particular state or condition, between application of a photographing mode being set in the image pickup apparatus immediately before the help mode is started, and application of the photographing mode corresponding to the turned position of the mode dial during the help mode,
wherein, in the step of applying the set state, the particular photographing mode is applied in response to an output obtained in the step of the selection.

10. The method according to claim 6, wherein the help mode is not terminated even if the image pickup apparatus is instructed to perform photographing by the release unit and the photographing is performed by the photographing control unit during the help mode.

11. A storage medium storing a program for controlling an image pickup apparatus having a help mode for displaying, on a display unit, representations of states or operating conditions set by operating a plurality of operating members, the program having program code executing the steps of:
setting a mode of the image pickup apparatus to one of a plurality of photographing modes;
setting, not in a help mode, the photographing mode to a photographing mode corresponding to a turned position of the mode dial in accordance with the turning of the mode dial;
starting the help mode;

displaying, on the display unit an explanation indicating the settable by the mode dial without actually changing the photographing mode settable by the mode dial in response to the operation of the mode dial;

when the image pickup apparatus is instructed by a release unit to perform photographing, executing a photographing operation under a predetermined photographing mode regardless of the operation by the mode dial after the help mode is started; and terminating the help mode, when the termination instruction terminates the help mode, the photographing mode corresponding to the turned position of the mode dial which was turned during the help mode.

\* \* \* \* \*